(12) United States Patent
    Crook

(10) Patent No.: US 8,038,175 B2
(45) Date of Patent: Oct. 18, 2011

(54) HVAC DUCT ASSEMBLY AND SUPPORT

(76) Inventor: Dale J. Crook, Olathe, KS (US)

( * ) Notice: Subject to any disclaimer, the term of this patent is extended or adjusted under 35 U.S.C. 154(b) by 465 days.

(21) Appl. No.: 12/330,380

(22) Filed: Dec. 8, 2008

(65) Prior Publication Data

US 2009/0090819 A1    Apr. 9, 2009

Related U.S. Application Data

(63) Continuation-in-part of application No. 11/971,855, filed on Jan. 9, 2008, now Pat. No. 7,914,047, which is a continuation-in-part of application No. 29/295,057, filed on Sep. 20, 2007, now Pat. No. Des. 580,543.

(51) Int. Cl.
    *F16L 35/00*    (2006.01)
(52) U.S. Cl. ......... 285/24; 248/316.1; 248/75; 248/74.3
(58) Field of Classification Search .............. 248/74.1, 248/74.2, 74.3, 230.1, 316.7, 316.1, 75, 79; 454/292; 24/115 R, 129 R; 138/106, DIG. 8
    See application file for complete search history.

(56) References Cited

U.S. PATENT DOCUMENTS

| | | | |
|---|---|---|---|
| 568,537 A | 9/1896 | Laubsch | |
| 1,891,874 A | 12/1932 | Elkins | |
| 2,170,557 A * | 8/1939 | Guarnaschelli | 285/61 |
| 2,172,130 A | 9/1939 | Powell | |
| 2,218,759 A | 10/1940 | Lineman | |
| 2,704,556 A | 3/1955 | Blish | |
| 3,179,442 A | 7/1965 | Lofgren | |
| 3,810,490 A | 5/1974 | Ludwick | |
| 3,813,733 A | 6/1974 | Flohr | |
| 3,836,750 A | 9/1974 | Caruso | |
| 3,929,164 A | 12/1975 | Richter | |
| 4,093,282 A | 6/1978 | Kyriakodis | |
| 4,158,462 A | 6/1979 | Coral | |
| 4,456,034 A | 6/1984 | Bixby | |
| 4,457,543 A | 7/1984 | Justus | |
| 4,669,508 A | 6/1987 | Neaves | |
| 4,699,046 A | 10/1987 | Bellieni | |
| 4,779,828 A * | 10/1988 | Munch | 248/74.3 |
| 4,795,197 A | 1/1989 | Kaminski | |
| 4,889,168 A * | 12/1989 | Kerzich et al. | 138/103 |
| 4,909,051 A * | 3/1990 | Lee | 70/16 |
| 4,951,902 A * | 8/1990 | Hardtke | 248/74.1 |
| 4,966,202 A | 10/1990 | Bryan et al. | |
| 5,248,119 A * | 9/1993 | Imura | 248/65 |
| 5,352,855 A * | 10/1994 | Potter | 174/135 |
| 5,368,337 A | 11/1994 | Torres | |
| 5,497,809 A | 3/1996 | Wolf | |
| 5,730,399 A * | 3/1998 | Baginski | 248/58 |
| 5,749,602 A | 5/1998 | Delaney et al. | |

(Continued)

*Primary Examiner* — Kimberly Wood
(74) *Attorney, Agent, or Firm* — Law Office of Mark Brown, LLC; Mark E. Brown

(57) ABSTRACT

A support assembly for supporting a flexible duct includes a radius strap for maintaining the desired angle of bend for the flexible duct. The radius strap retains its shape through ribs along the back side of the strap. The assembly is secured at both ends to the flexible duct via arms branching off of cross pieces which branch off from the radius strap. The arms contain slots which allow varying connection devices to pass through and across indentations at the ends of the ribs to secure the flexible duct to the assembly itself and to varying pieces of HVAC equipment.

1 Claim, 13 Drawing Sheets

U.S. PATENT DOCUMENTS

| | | |
|---|---|---|
| 5,894,866 A | 4/1999 | Horst et al. |
| 5,989,006 A | 11/1999 | Godeau |
| 6,139,068 A | 10/2000 | Burress et al. |
| 6,837,787 B2 | 1/2005 | Crook |
| 2003/0080553 A1 | 5/2003 | Wieder et al. |

* cited by examiner

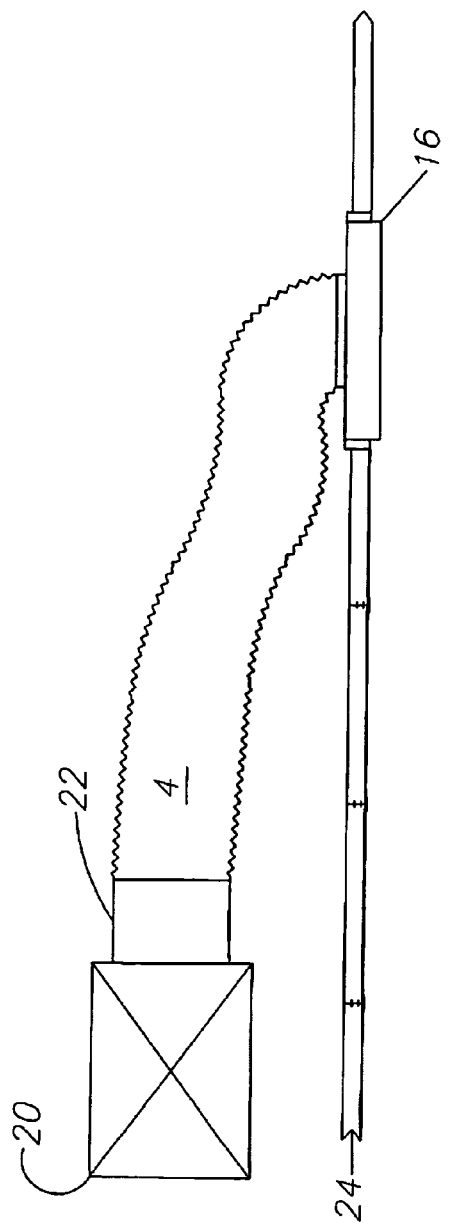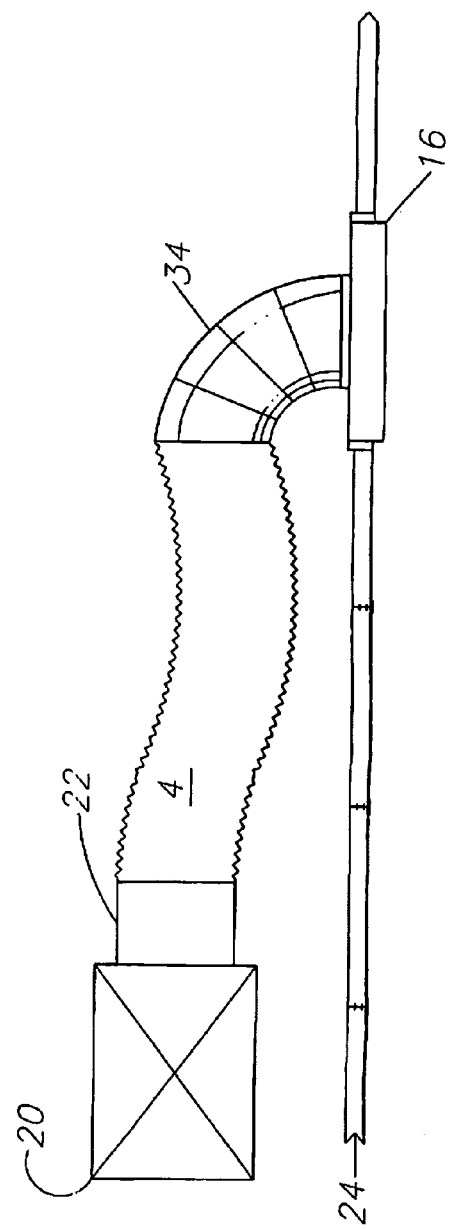

HVAC DUCT ASSEMBLY AND SUPPORT

CROSS-REFERENCE TO RELATED APPLICATION

This application is a continuation-in-part of and claims the benefit of U.S. patent application Ser. No. 11/971,855, filed Jan. 9, 2008 now U.S. Pat. No. 7,914,047, which is a continuation-in-part of and claims the benefit of U.S. patent application Ser. No. 29/295,057, filed Sep. 20, 2007 now U.S. Pat. No. D,580,543, which are incorporated herein by reference.

BACKGROUND OF THE INVENTION

1. Field of the Invention

The present invention relates generally to ductwork for heating, ventilating and air conditioning ("HVAC") systems, and in particular to a support for protecting a length of flexible ductwork from crimping.

2. Description of the Related Art

Hoses, ducts and conduits in various sizes and configurations are commonly utilized for conveying, routing and directing various substances and objects. In dynamic systems, examples of such substances include air which has been heated or cooled by heating and air conditioning equipment. In the construction industry, such systems are commonly referred to as heating, ventilating, and air conditioning ("HVAC") systems.

Typical HVAC systems include runs of ductwork extending from the heating and air conditioning equipment to additional air handling equipment, or to distribution devices, of which supply diffusers, duct collars, duct taps, duct take-offs, register boxes, energy recovery ventilators, heat recovery ventilators and filter boxes are just examples. Additional air handling equipment examples include variable air volume ("VAV") boxes which are located in plenum spaces in many commercial structures. Heated and cooled air is typically introduced into the occupied spaces of buildings by diffusers which direct the airflow in predetermined distribution patterns for maximizing the comfort of the occupants.

Routing ductwork from the HVAC equipment to the supply diffusers or other equipment often involves ducting routes which turn, bend and intersect with various components and with other runs of ductwork. To accommodate such curved, angled, and bent routing, flexible duct is commonly used for the final portions of the duct runs, which terminate at diffusers or other components. Flexible duct also has the advantage of being easily reconfigurable to accommodate changed space configurations and the like. Another advantage of flexible duct is that it is available with insulation to avoid condensation and energy loss during cooling operation and is therefore widely used in spaces above ceilings. Flexible duct is often used in residential attic spaces and crawl spaces because it is insulated and easily manipulated in tight spaces.

However, a disadvantage of flexible duct is that it tends to crimp when bent. For example, 90° turns into diffusers can crimp unprotected flexible ducts. Crimping tends to restrict air flow and lower overall system efficiency. HVAC equipment thus works harder and consumes more power to overcome flow resistance associated with crimped flexible ducts.

A prior art solution to the problem of flexible duct crimping at diffusers and other bending locations is to install metal elbows. However, such additional components involve additional labor and material costs, as well as the possible need to insulate the metal elbow.

Other prior art solutions involving flexible duct sleeves to protect the curve of the flexible duct do not alleviate the cost issue. Prior designs use a lot of material, are difficult to manufacture, require time to strap onto the device, and are not as cost-effective as they could be.

The present invention addresses all of the disadvantages of prior art solutions to flexible duct installations. Heretofore there has not been available a support for flexible duct with the advantages and features of the present invention.

SUMMARY OF THE INVENTION

In the practice of the present invention, a support assembly is provided for flexible ducts. The support assembly includes two cross pieces branching off of a spine generally following the inner radius (IR) of the flexible duct bend. Each cross piece includes two arms. The arms are flexible enough to partially wrap around a flexible duct accommodating multiple duct diameters. The arms contain slots for use with a multitude of connecting devices commonly used in the HVAC trade, including metal wire, hose clamps, and nylon zip-ties. The spine is designed with ribs so that it will remain firm for the flexible duct to rest upon so that crimping cannot occur, and indentations for preventing the connecting devices from sliding off of the ribs. The support is designed to work with bending flexible duct for quick attachment while using common materials for connection.

BRIEF DESCRIPTION OF THE DRAWINGS

FIG. 7a is an elevation of a prior art configuration of the installation shown in FIG. 7, including a crimped flexible hose.

FIG. 7b is an elevation of a prior art configuration of the installation shown in FIG. 7, with an uninsulated galvanized sheet metal elbow transitioning from a length of flexible duct to a ceiling diffuser.

DETAILED DESCRIPTION OF THE PREFERRED EMBODIMENTS

I. Introduction and Environment

Figure 1:
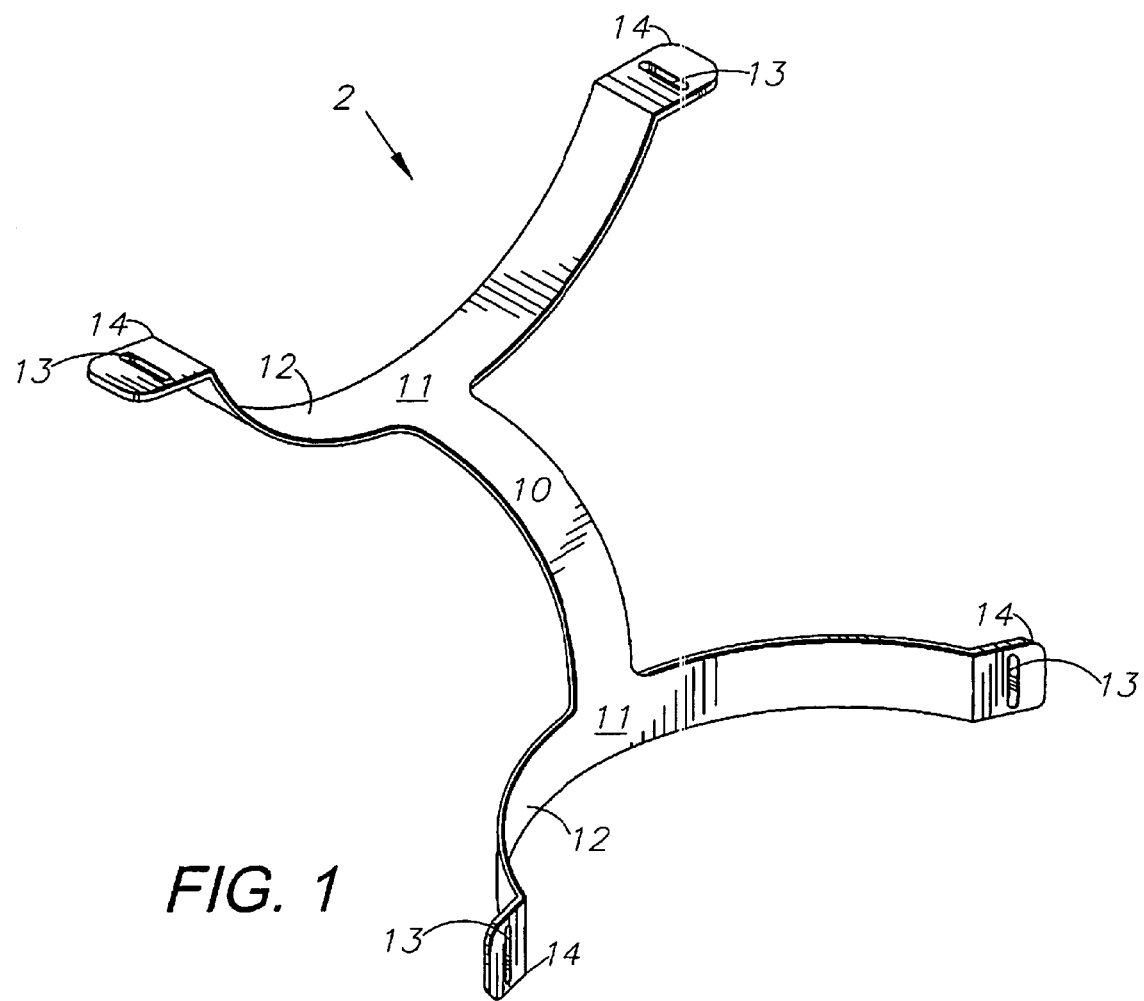
FIG. 1 is a perspective view of a support assembly for flexible duct.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, up, down, front, back, right and left refer to the invention as oriented in the view being referred to. The words "inwardly" and "outwardly" refer to directions toward and away from, respectively, the geometric center of the embodiment being described and designated parts thereof. Said terminology will include the words specifically mentioned, derivatives thereof and words of similar meaning. The invention can be fabricated in various sizes and configurations from a wide variety of suitable materials, which are chosen for their characteristics according to the intended use and the operation of the invention.

Referring to the drawings in more detail, the reference numeral 2 generally designates a structural support for a length of flexible duct 4 at a bend 5 designed to ensure the duct does not crimp when attached to a diffuser 16 or other similar device such as duct collars, duct taps, duct take-offs, register boxes, energy recovery ventilators, heat recovery ventilators, and filter boxes, but the use of this device is not limited to these examples. Common usage of flexible duct which would benefit from the structural support device 2 includes, but is not limited to, use in residential attics and crawl spaces, as well as use in commercial acoustical ceiling systems. The support 2 is mainly comprised of a radiused spine 10, supported by ribs 9, from which two cross pieces 11 branch out to form four arms 12. Each of these arms contains a tab 14 with a slot 13. These slots 13 allow a connecting element 6 to pass through the slot 13 and attach the support device 2 to the flexible duct 4, securing the duct to a diffuser 16 or other similar element. The bend 5 angle can be designed for any angle by changing the angle of the radius strap 10.

II. Support Device 2

The support device 2 comprising a first modified embodiment of the present invention can be molded from plastic or some other suitable material. The ribs 9 supporting the structure of the spine 10 provide maximum support with minimal material requirements. The entire assembly 2 is comprised of minimal amount of material, which is an advantage over prior art. The connection devices 6 that pass through slots 13 within tabs 14 at the end of each arm 12 can be of any suitable and common product for use with HVAC systems, but are separate from the actual support device 2.

The flexible duct 4 is generally supported by a thin wire ring that encircles the duct and this wire will not support the duct in a bend 5. When the flexible duct is bent at an angle, the wires collapse slightly and less air is allowed to pass through the duct. This collapse typically occurs at the inner radius, while the outer radius is flattened as the wire bends. Thus the support device 2 and its elements, especially the rigidity of the spine 10, are necessary to ensure crimping of the flexible duct 4 does not occur.

Figure 2:
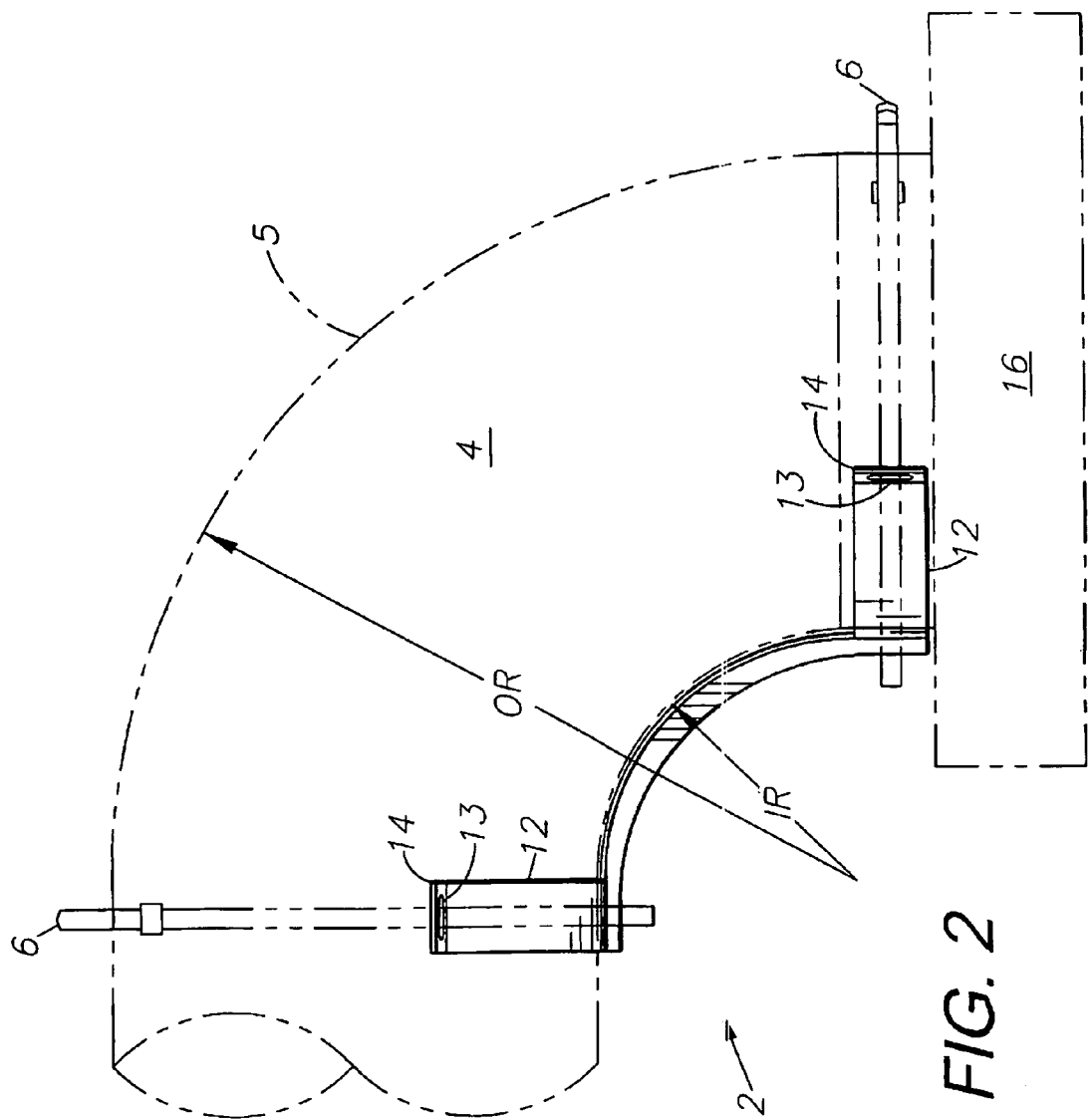
FIG. 2 is a side elevation showing the support assembly supporting a flexible duct.
Figure 3:
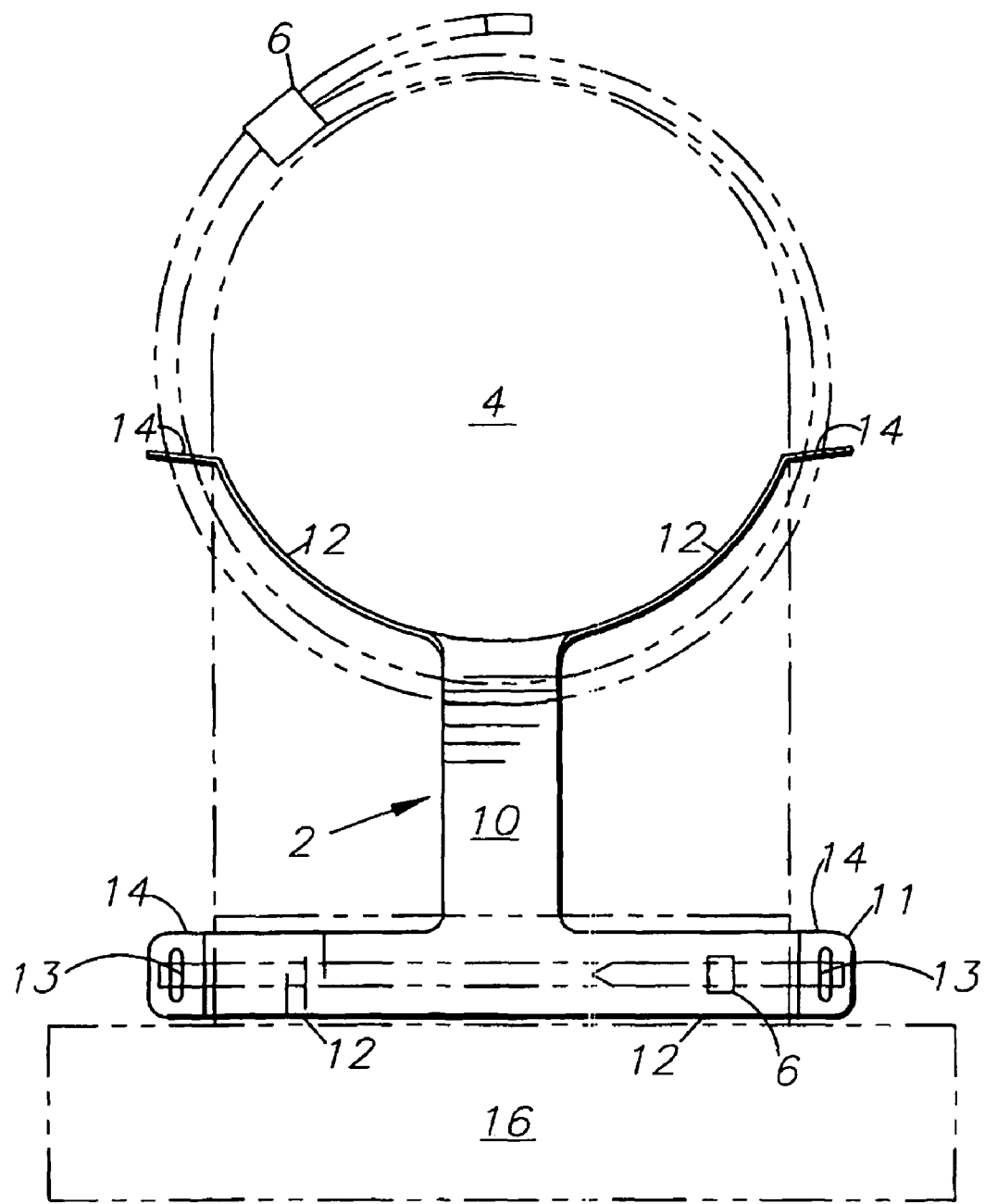
FIG. 3 is a front elevation showing the support assembly supporting a flexible duct.
Figure 4:
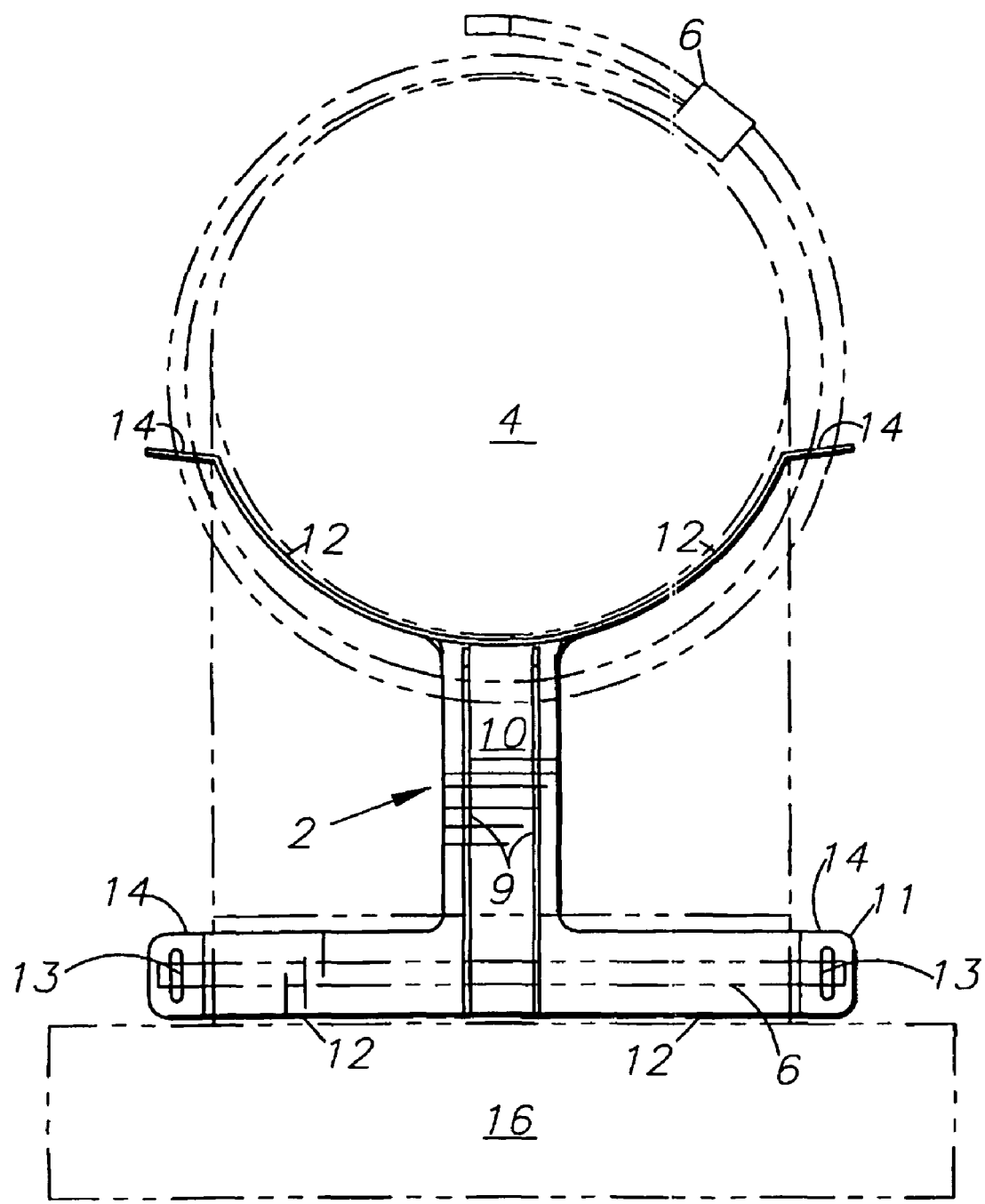
FIG. 4 is a rear elevation showing the support assembly supporting a flexible duct.

The spine 10 is the main structural element of the support device 2. The spine 10 has an inner face and an outer face. Ribs 9 along the outer face of the device provide strength to the spine 10 with minimal materials requirements. The spine 10 establishes the inner and outer radiuses and can be designed for any bend 5 angle that would be desired for a flexible duct 4 and provides guidance to the duct so that crimping cannot occur as shown in FIGS. 2, 3, and 4. By establishing the inner and outer radiuses, the support device 2 prevents crimping of the flexible duct 4. The spine 10 is rigid, causing the cross pieces 11 to retain their designed angles.

The arms 12 that wrap themselves partially around the flexible duct 4 provide stability and ensure that the duct cannot fall off of the path projected by the spine 10. The arms 12 are made of flexible material and thus can accommodate several sizes of flexible duct 4. The arms 12 are pre-bent to a degree to make installation of the device easier on the worker. The arms 12 extend off of the cross piece 11 which is supported by the spine 10. Because the radius strap 10 is rigid, the cross pieces 11 and arms 12 retain their originally intended angles.

Each arm 12 has a tab 14 containing a slot 13. The edges of these tabs 14 as formed from plastic or other suitable material will be rounded to protect both the relatively fragile flexible duct 4 as well as the worker installing the device. The slots 13 allow a connecting device 6 to pass through it. This connecting device 6 can be of a number of materials or devices, from common metal wire, to a more secure nylon zip-strap. When the arms 12 are securing the flexible duct 4 to a diffuser 16 or other piece of HVAC equipment, a more secure connecting device 6 can be used to ensure that the flexible duct 4 does not slip off of the diffuser 16 or other device. When the arms 12 are being used on the other end of the bend, a less expensive connecting device 6 can be passed through the slots 13 and used to merely prevent the flexible duct 4 from slipping off of the support 2.

III. Installations

Figure 5:
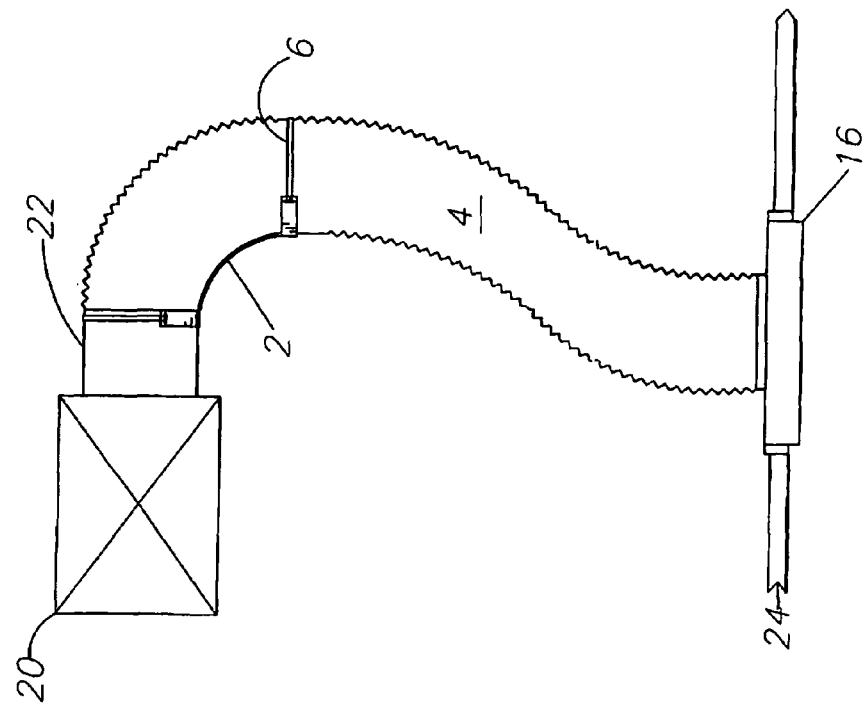
FIG. 5 is a side elevation of a first installation of the support device.

FIG. 5 shows a first installation or application of the flexible duct support device 2 in an HVAC system including a supply duct 20 and a round tap 22 connected to the same. The support device 2 secures the end of a length of flexible duct 4 to the round tap 20 using any connecting device 6, including mounting screws or ties. The opposing end of the flexible duct is shown attached to a diffuser 16 mounted in a ceiling tile 24, but is not limited to this application.

Figure 5A:
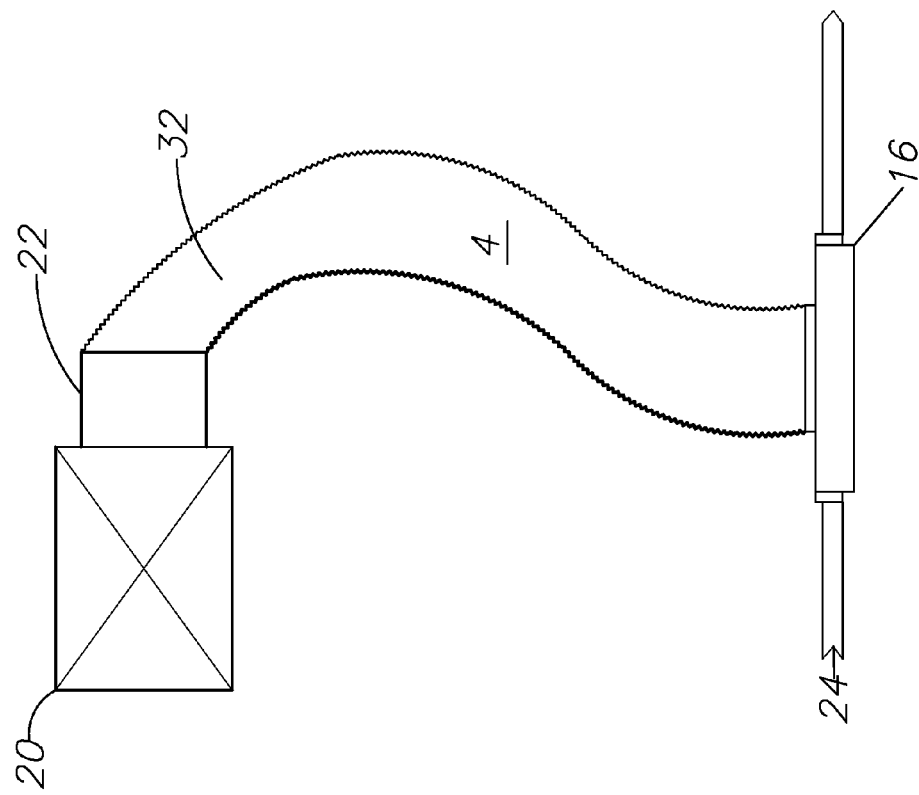
FIG. 5a is a side elevation of a prior art configuration of the installation shown in FIG. 5.

A prior art configuration is shown in FIG. 5a and illustrates a potential restricted flow choke point 32, which is avoided by use of the support device 2.

Figure 6:
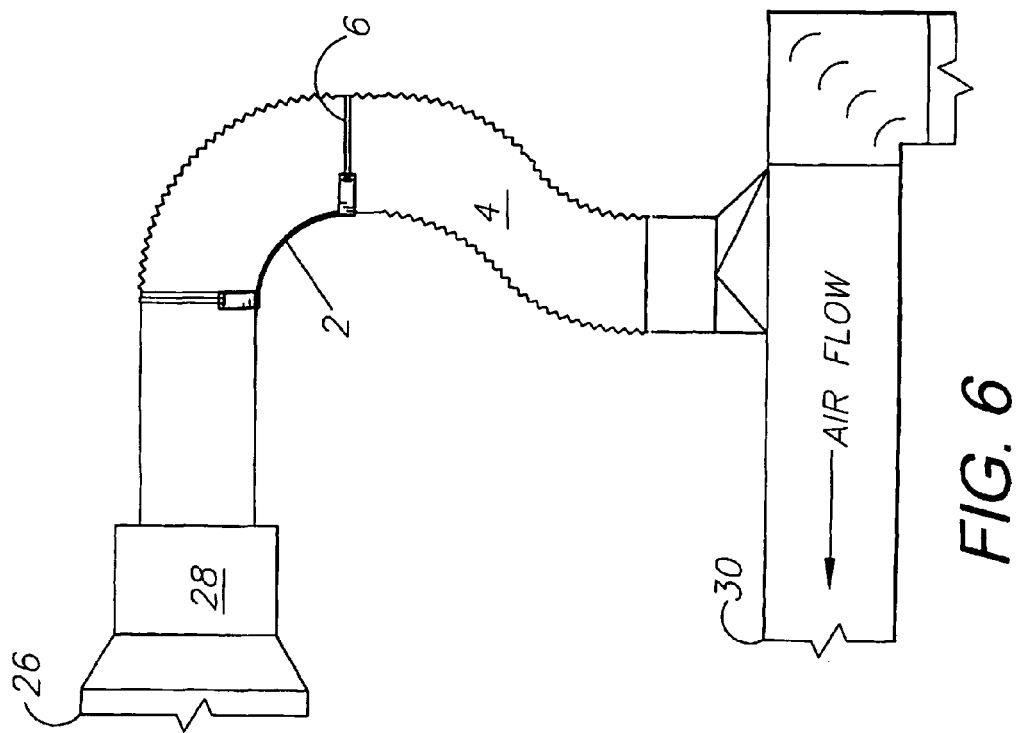
FIG. 6 is a plan view of a second installation of the support device.

FIG. 6 shows an installation of a flexible duct support device 2 used in collaboration with a support (e.g., wire) 18 to connect a length of flexible duct 4 to a variable air volume ("VAV") box 28 fed by a low pressure duct 26. The support device 2 ensures that the straight piece supported by the support strap 18 turns at the desired bend 5 angle and drops into the high pressured duct 30.

Figure 6A:
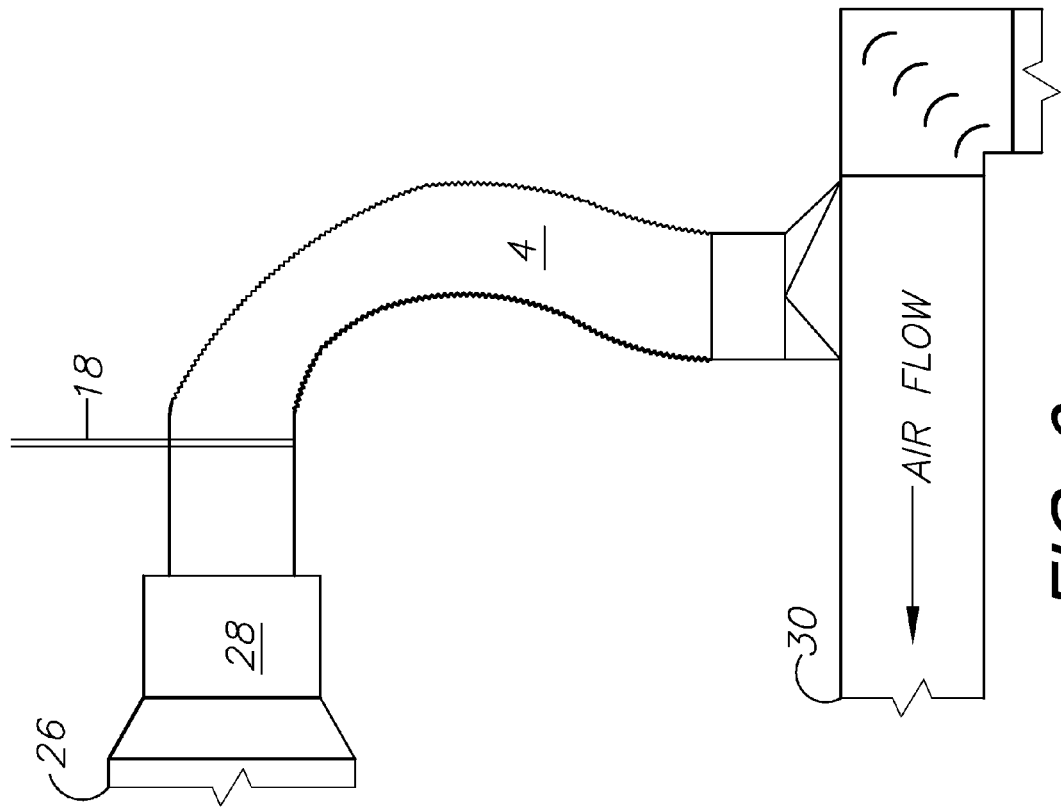
FIG. 6a is a plan view of a prior art configuration of the installation shown in FIG. 6.

FIG. 6a shows a prior art configuration for connecting a length of flexible duct 4 to a VAV box 28 whereby a choke point 32 can occur.

Figure 7:
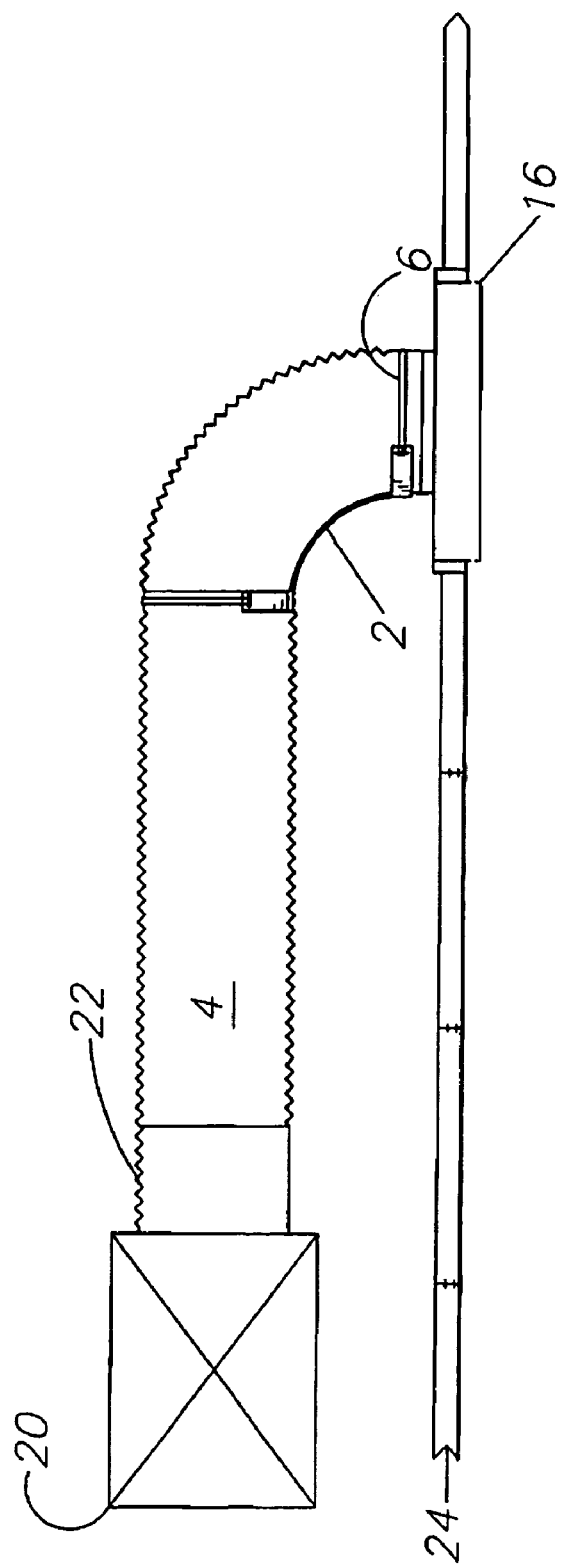
FIG. 7 is an elevation of a third installation of the support device.

FIG. 7 shows a flexible duct support device 2 coupling a length of flexible duct 4 directly to a diffuser 16 with the use of a connecting material 6. Prior art construction details for this configuration are shown in FIGS. 7a and 7b. FIG. 7a shows the potential choke point 32 which can form if no special consideration is given to maintaining the shape of the bend 5 in the flexible duct. FIG. 7b shows a prior art solution to this problem wherein a galvanized elbow 34 is connected to the flexible duct 4 and the diffuser 16.

Figure 8:
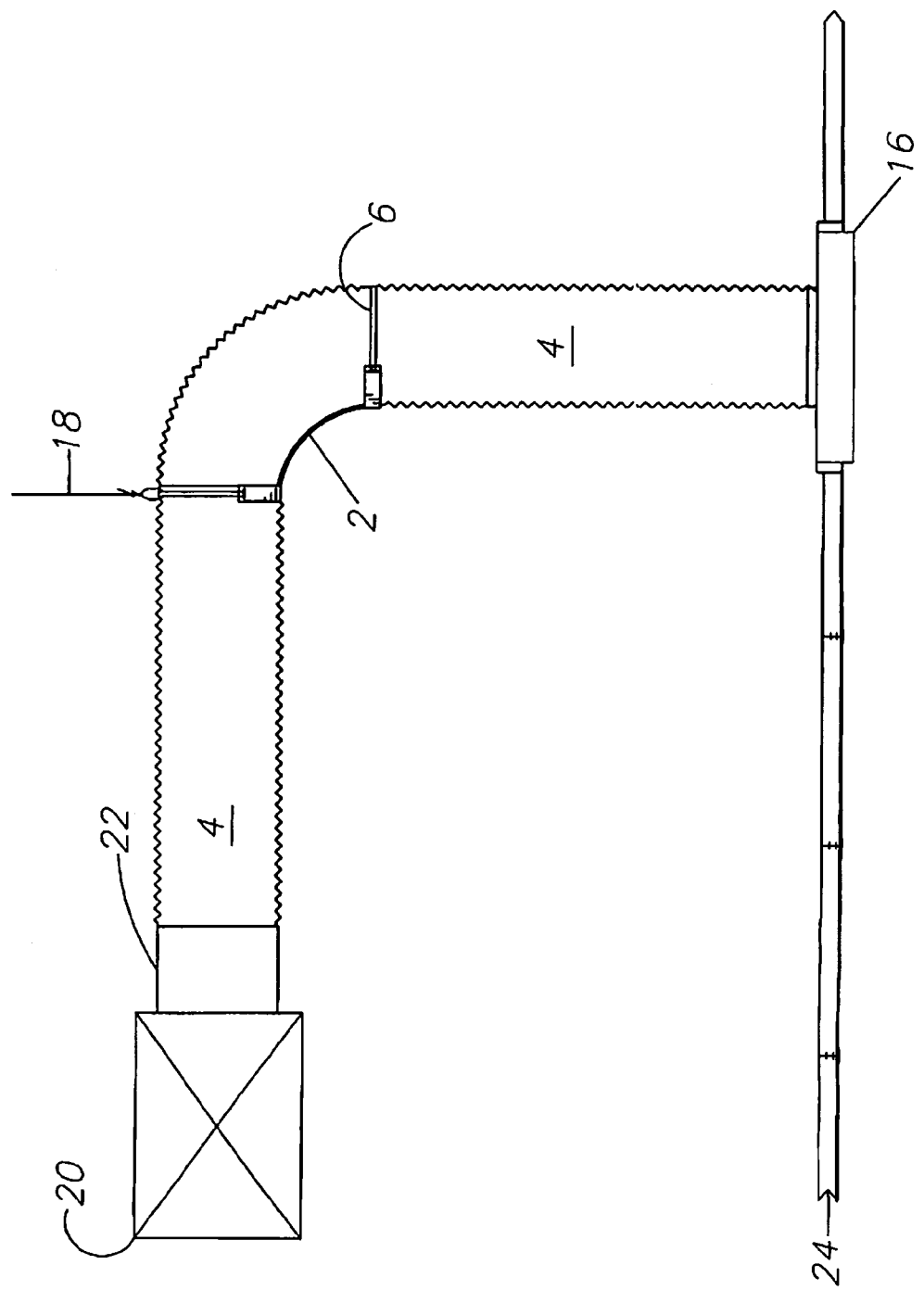
FIG. 8 is an elevation of an installation of the support device at a 90 bend of a flexible duct, shown suspended from the underside of a floor slab.

FIG. 8 is another installation of the flexible duct support device 2 for supporting a length of flexible duct 4 at a bend 5 thereof located intermediate a supply duct 20 and a diffuser 16 mounted in a ceiling tile 24.

IV. Alternative Embodiment or Aspect Support Device 102

Figure 9:
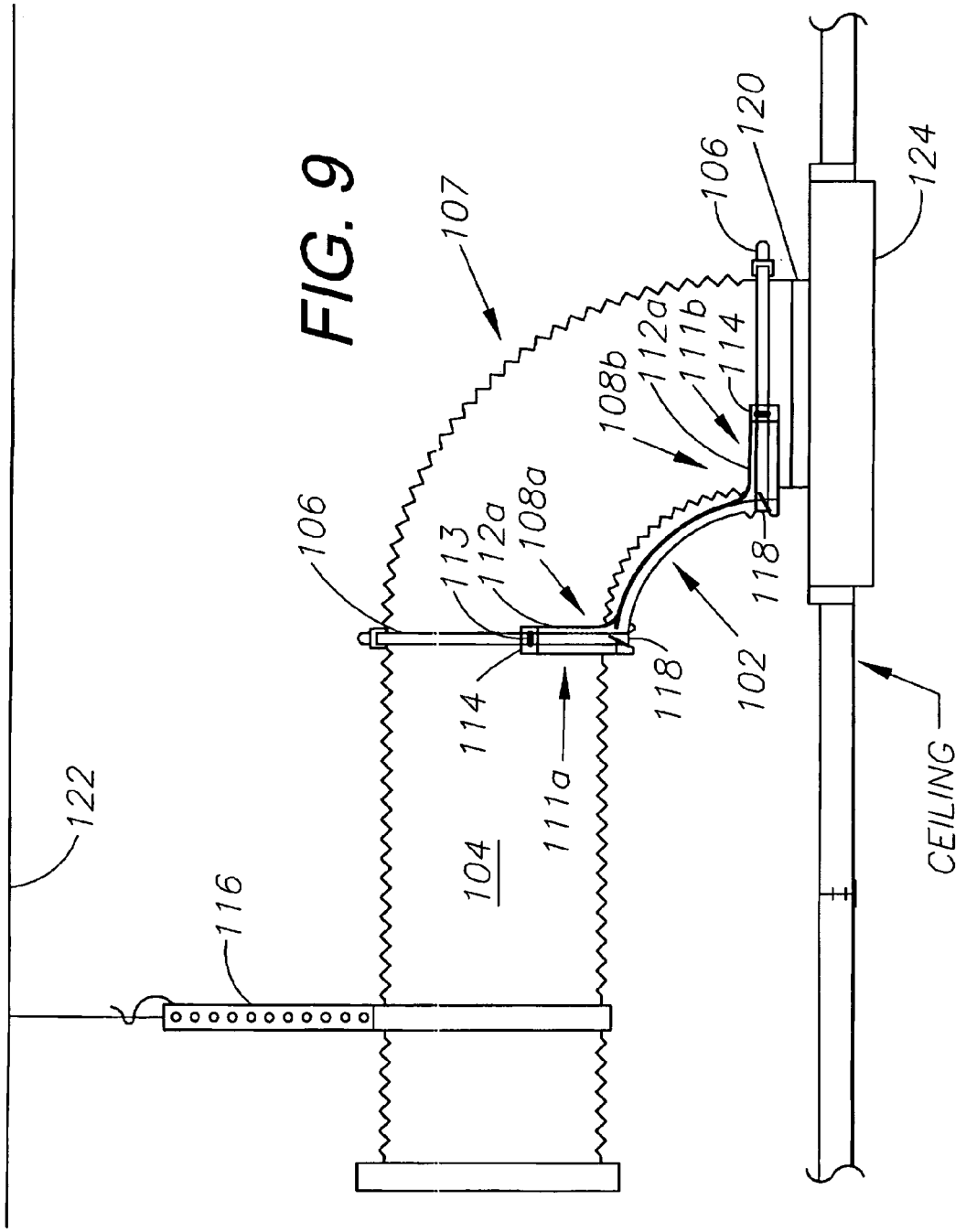
FIG. 9 is a perspective view of an alternative embodiment support device for a flexible duct.
Figure 10:
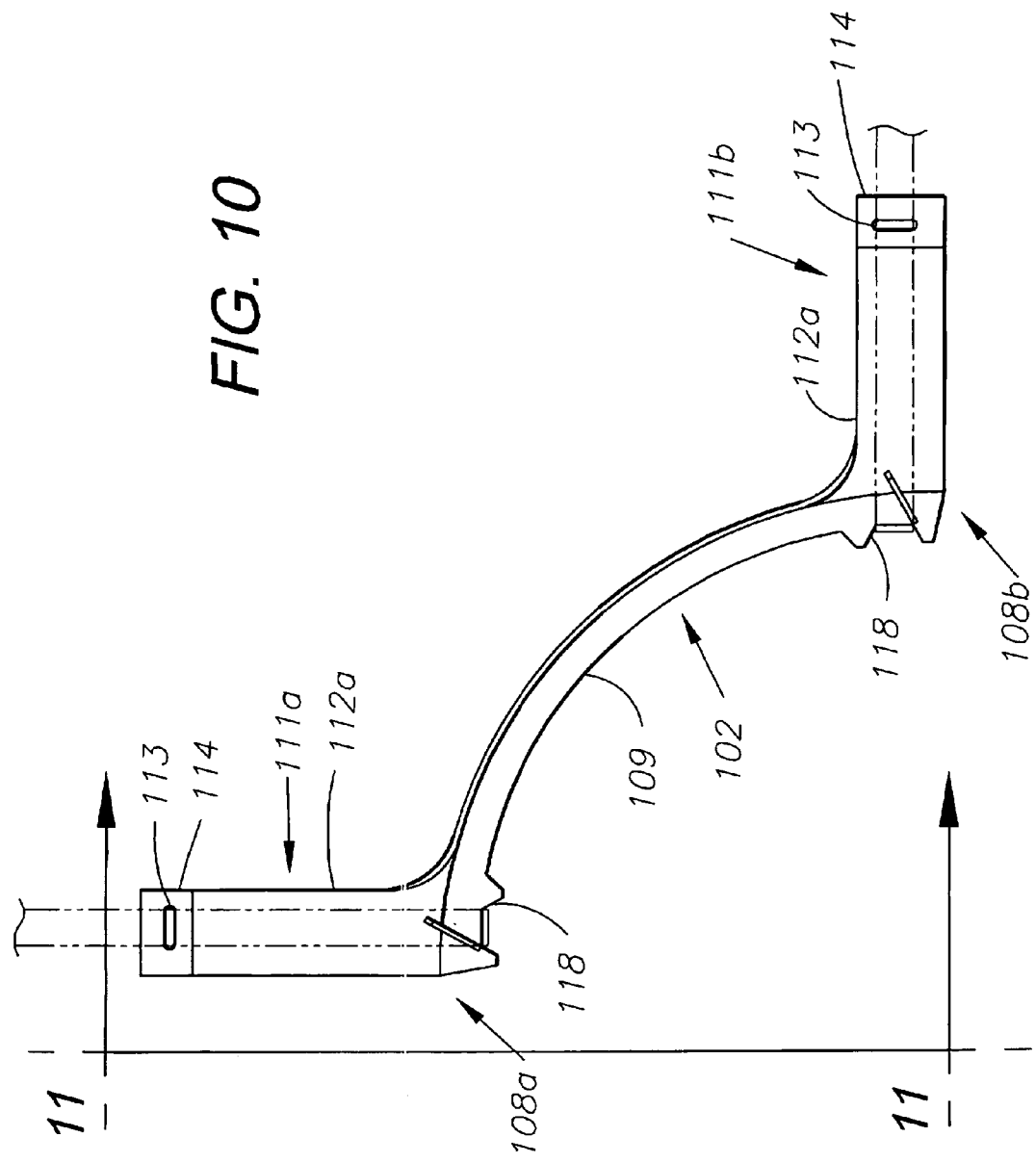
FIG. 10 is a side elevation of an alternative embodiment support device.
Figure 11:
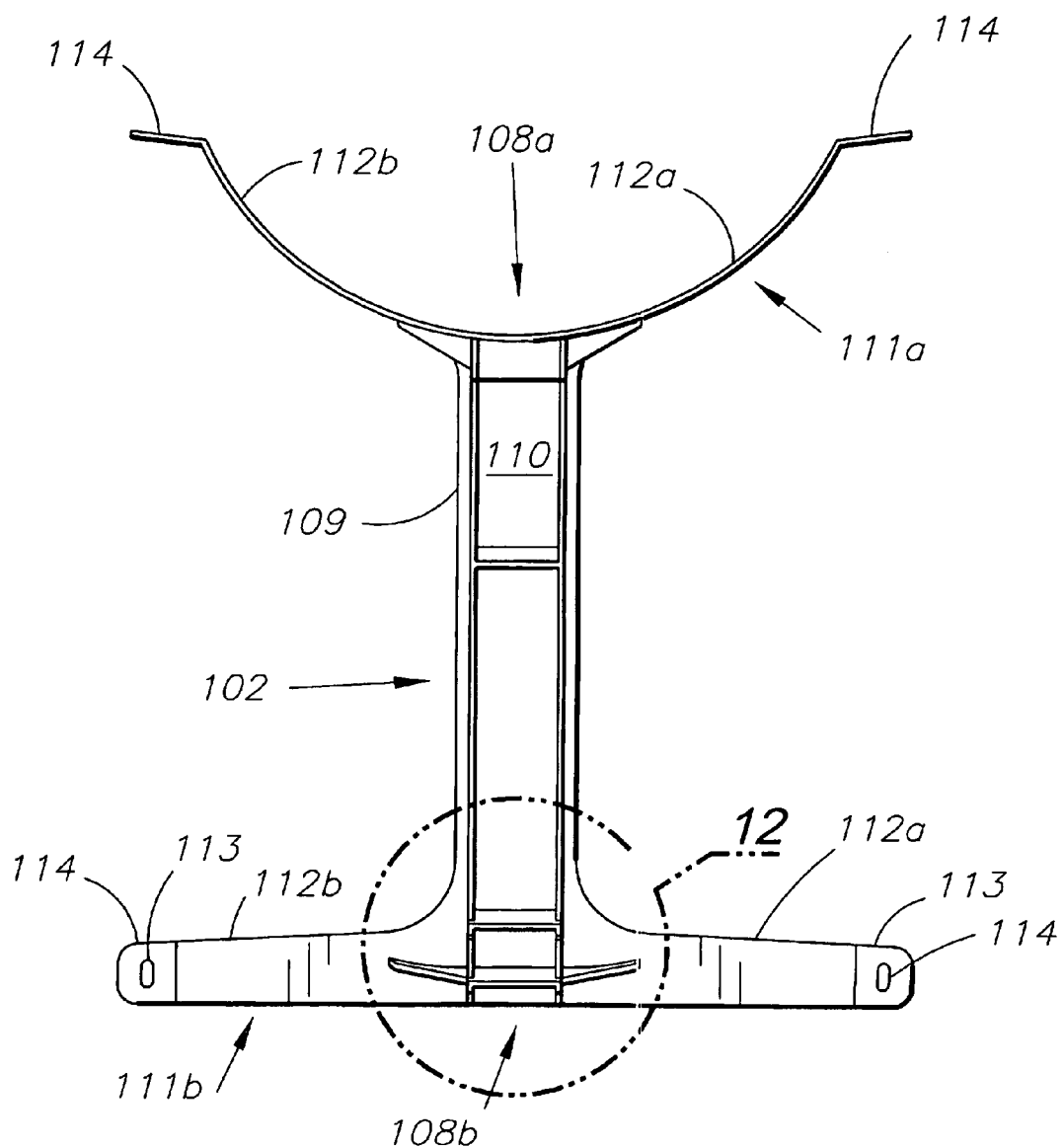
FIG. 11 is a front elevation of an alternative embodiment support device.
Figure 12:
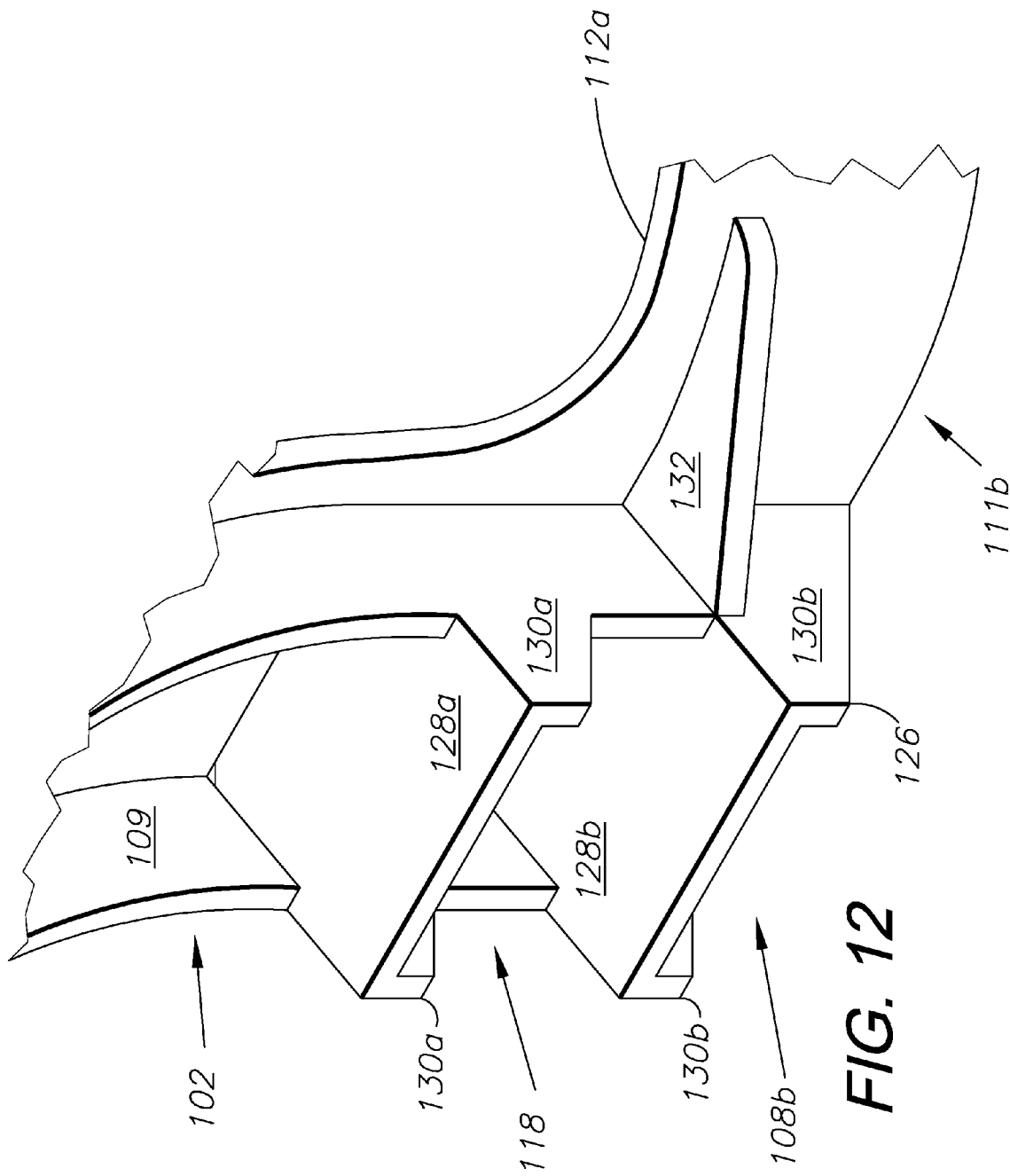
FIG. 12 is an enlarged fragmentary view taken generally in circle 12 in FIG. 11, and showing an end of the alternative embodiment support device.

A support device 102 comprising yet another embodiment or aspect of the present invention is shown in FIGS. 9-12. Referring to FIGS. 10-12, the support device 102 includes a radiused spine 110 having an inner and outer face, and first and second ends 108a,b. First and second cross pieces 111a,b branch out from the first and second ends 108a,b respectively to form first and second arms 112a,b that are pre-bent to a degree enabling them to partially wrap around the flexible duct 104. The end of each arm contains a tab 114 with a slot 113 that allows a connecting element 106 to pass through and attach the support device 102 to a flexible duct 104. Ribs 109 project from the outer face of the spine 110 along its length, providing strength and semi-rigidity to the spine 110.

The ribs 109 terminate at the first and second ends 108a,b of the spine 110 at rib end subassemblies 128 with indentations 118 adapted to receive a connecting element 106 whereby the indentations 118 limit the movement of the connecting element 106 up or down the spine 110. The rib end subassemblies 126 include proximate and distal panels 128a,b extending between the ribs 109 and also extending from the spine 110 inwardly beyond the rib 109 inner edges. Panel stiffener extensions 130a,b are generally coplanar with the ribs 109 and are connected to the panels 128a,b respectively. Each rib end assembly 126 also includes a gusset 132 extending from a respective distal panel 128 and rib 109 to a respective arm 112a,b. The configurations of the rib end subassemblies 126 provide relatively secure attachments for the connecting elements 106, which are thus firmly secured when the connecting elements 106 are tied around the flexible duct 104 and the crosspieces 111a,b. An intermediate brace 134 extends between the ribs 109 and provides semi-rigidity for the spine 110 and the ribs 109. The support device 102 can be molded from plastic or other suitable materials and adapted to accommodate flexible ducts 104 of varying dimensions.

In an exemplary application, the flexible duct 104 is configured for use as a sound-attenuated element in a return air assembly. Referring to FIG. 9, a run of flexible duct 104 is routed about a radius forming a bend 107 supported by the support device 102 by securing the end of a length of flexible duct 104 to the round top 120 of a distribution/collection device 124 such as a return grill servicing an occupied space, by mating the first and second arms 112a,b of the second cross piece 111b with the portion of the flexible duct 104 surrounding an outlet flange 120. A connecting element 106 is threaded through each slot 113 and drawn together to encircle the flexible duct 104. The connecting device 106 can consist of any number of devices and materials, including, but not limited to metal wire, hose clamps, or nylon zip-straps. When the connecting element 106 is tightened, the connecting element 106 is drawn within and traverses the indentation 118 thereby limiting the movement of the connecting element 106 up or down the spine 110 and securely engaging the support device 102 and the flexible duct 104 to the outlet flange 120.

The remaining run of flexible duct 104 is positioned across the spine 110 and through the first arm 112a. A connecting element 106 is threaded through each slot 113 in the tabs 114, traversing the indentation 118 thereby preventing the connecting element 106 from slipping off the support device 102, and secured to an overhead structure 122. The remaining horizontal run of flexible duct 104 may be supported by suspending the duct below an overhead structure 122 using a suspending strap 116 consist of any number of devices and materials, including, but not limited to metal wire or plastic webbing.

The aforementioned exemplary embodiment of the support device 102 provides attenuation of acoustics emanating from the HVAC system and the occupied space. More specifically, sound is trapped in the insulated duct 104, with the bend 107 preventing direct passage of sound from the occupied space into the plenum. The return air function of the duct 104 operates normally by drawing return air from the occupied space into the plenum, or to a return air duct system.

It is to be understood that the invention can be embodied in various forms, and is not to be limited to the examples discussed above. Other components and configurations can be utilized in the practice of the present invention. For example, support devices embodying aspects of the present invention can be scaled to a wide range of appropriate sizes to accommodate ductwork of multiple diameters, and can be manufactured from a wide range of suitable materials utilizing appropriate manufacturing procedures.

Having thus described the invention, what is claimed as new and desired to be secured by Letters Patent is:

1. In combination with a structure including a suspended ceiling and an overhead structure with a plenum located therebetween, the improvement of a sound attenuating duct system comprising:
   an air collection return grill mounted in the suspended ceiling and including a cylindrical outlet collar;
   a length of flexible duct having a bend forming an inner radius (IR) and an outer radius (OR) of said duct bend;
   said duct having a proximate end receiving said return grill outlet collar and a distal end open to said plenum;
   a duct support having a spine with opposite first and second ends;
   said spine having a curvature generally corresponding to the inner radius (IR) of said duct bend;
   said duct support having first and second cross pieces mounted on said spine first and second ends and adapted for partially encircling said duct on either side of said bend;
   each said cross piece including a pair of arms extending laterally outwardly therefrom;
   each said arm terminating at a tab angled outwardly with respect to said arm and including a slot;
   first and second connecting devices each adapted for connecting a respective said cross piece to the duct on either side of the bend, said connecting devices comprising locking ties extending through said arm tab slots;
   a pair of ribs generally following the IR and extending between said spine ends, each said rib including an inner edge;
   a pair of rib end subassemblies each located at a respective spine end and including an indentation receiving a respective connecting device;
   each said rib end subassembly including proximate and distal panels each extending from said spine and projecting inwardly beyond said rib inner edges;
   each said rib end subassembly including proximate and distal pairs of panel stiffener extensions each generally coplanar with a respective rib and connected to a respective rib and a respective panel;
each said rib end subassembly including a pair of gussets each extending laterally from a respective rib and connected to a respective arm;
first and second connecting devices comprising locking ties, each said locking tie being adapted for connecting a respective said support end to the duct on either side of the bend;

said locking tie on said duct first end securing said support device and said first duct end to said return grill outlet collar; and
a hanger strap attached to the overhead structure and encircling and supporting said flexible duct distally of said support device.

* * * * *